United States Patent [19]
Redel

[11] Patent Number: 4,798,695

[45] Date of Patent: Jan. 17, 1989

[54] PROCESS FOR THE PRODUCTION OF LAMINATED GLASS PLATES

[76] Inventor: Dieter G. Redel, Industriestr 18, Waldmohr, Fed. Rep. of Germany

[21] Appl. No.: 35,503

[22] Filed: Apr. 7, 1987

[30] Foreign Application Priority Data

Apr. 8, 1986 [EP] European Pat. Off. ........ 86104785.0

[51] Int. Cl.⁴ ............................................. B29C 51/00

[52] U.S. Cl. .................................... 264/164; 264/261; 264/277; 264/279; 156/107; 156/109; 52/790

[58] Field of Search .................... 52/172, 788, 790, 73, 52/259; 264/261, 164, 246, 271.1, 277, 279; 156/109, 107

[56] References Cited

U.S. PATENT DOCUMENTS

| | | | |
|---|---|---|---|
| 2,502,304 | 3/1950 | Baker | 264/41 |
| 3,765,810 | 10/1973 | Smarook | 264/164 |
| 3,919,023 | 11/1975 | Bowser et al. | 156/109 |
| 4,149,348 | 4/1979 | Pyzewski | 52/790 |
| 4,622,249 | 11/1986 | Bowser | 52/788 |
| 4,680,155 | 7/1987 | Rochefort et al. | 264/73 |

FOREIGN PATENT DOCUMENTS

| | | | |
|---|---|---|---|
| 344368 | 7/1978 | Austria . | |
| 0047725 | 3/1982 | European Pat. Off. . | |
| 0181963 | 11/1984 | European Pat. Off. . | |
| 2635641 | 2/1978 | Fed. Rep. of Germany | 156/109 |
| 2710570 | 9/1978 | Fed. Rep. of Germany | 156/107 |
| 3317678 | 11/1984 | Fed. Rep. of Germany . | |
| 1303166 | 7/1962 | France . | |
| 1462767 | 11/1966 | France . | |
| 1563666 | 3/1969 | France . | |
| 2161379 | 7/1973 | France . | |
| 2182359 | 12/1973 | France . | |
| 01446858 | 4/1969 | Fed. Rep. of Germany . | |

*Primary Examiner*—Bernard Nozick
*Attorney, Agent, or Firm*—John H. Shurtleff

[57] ABSTRACT

In this process for the production of multilayer glass plates with a plurality of glass panes spaced from one another in a frame and with hardenable synthetic material and shaped bodies in the intermediate space between the panes, there is applied to a horizontally positioned first pane (1) the synthetic material (2) before it hardens from a viscous state in selected places and in uneven thickness; the shaped bodies (4) are then brought onto or between the places containing the synthetic material, whereupon a second pane (3) is laid at a spaced interval over the first pane (1) and the set consisting of the two panes is surrounded with a frame (7). In order to bond the two panes of glass together with the synthetic material, the two panes are laid one upon another, turned 180° and maintained in this position while the viscous synthetic material flows downwardly forming threads or drops which join the two panes and bonds them together when the synthetic material is hardened.

7 Claims, 1 Drawing Sheet

PROCESS FOR THE PRODUCTION OF LAMINATED GLASS PLATES

The invention relates to a process for the production of laminated or multilayer glass plates.

It is known (British patent No. 1,150,238) to produce decorative glass elements by arranging two glass panes at a spaced interval from one another and bringing a molten or liquid synthetic material into the intervening space or gap between the two panes. A disadvantage here is the requisite filling of the entire space or gap with synthetic material, which also leads to increased costs due to expensive labor. If bubbles are to be brought into the synthetic material here, then an expensive process must be used to bring the air under pressure into the space or gap filled with synthetic material.

It is further known (French Pat. Nos. 1,259,038, P 20 08 415.5, P 14 46 858.7) to manufacture decorative elements by gluing and cementing foreign bodies, for example pieces of glass, after initially arranging them in the intervening space or gap. Special forms or designs, such as striations or frosted patterns, cannot be produced with this process, which is a disadvantage because these structures or designs are rich in their varieties and very attractive.

For better insulation it is often necessary to assemble several components into an insulating glass. The danger exists in this case that outside moisture will penetrate into the synthetic material or cement being used, so that the structural element becomes foggy and unattractive.

It was the task of the present invention to come up with a process for the production of multilayer glass plates which avoids the noted disadvantages and which can be economically carried out. Furthermore, the weight of the multilayer glass plate was to be reduced, in order to facilitate production and transport.

In accordance with the invention, this multilayer glass plate consists of a plurality of panes spaced from one another while held in a frame with a hardenable synthetic material and molded or shaped bodies in the interspace or gap between the panes. The new process for the production of these plates is characterized according to the invention in that:

1. Onto a horizontally lying first pane, a synthetic material before hardening is applied in a viscous state at points or selected sites and in uneven thickness, 2. Shaped bodies are brought onto or between the surface portions occupied by or coated with the synthetic material, 3. A second pane is laid over the first pane and spaced at an interval in such a way that the synthetic material is not touched;

4. The set or packet consisting of the two panes is surrounded with the frame,

5. The packet is turned through 180°, and 6. is maintained in this position until the viscous synthetic material no longer flows downwardly, forming threads or drops.

Through application of the synthetic material here and there with varying thickness, there is achieved a saving in material and consequently a reduction of the costs. The formation of streaks, striations or bubbles by pressing the two panes together occurs in a manner which depends on the application and the viscosity of the synthetic material and is adjustable within a broad ratio of covered surface to uncovered surface. Each form or structure is unique and cannot be identically produced a second time, which is an advantage for use, for example, in building structures. By applying the synthetic material or adhesive with a spatula, there are achieved textures like genuine antique glass.

Special structures with peculiar or special properties of optical refraction result when the synthetic material is applied with increasing thickness in the lengthwise direction of the pane and the two panes are pressed on one another in an oblique or slanted position.

Concave and convex planes in the surface of the panes are acheived if the frame surrounding the packet is secured or clamped with uneven strength.

If especially high noise insulation is to be achieved, then in a further development of the invention, a first pane is used which is smaller than the second pane, and after the rotation, a third pane—with the same dimensions of the second is laid on the packet or paired set at a spaced interval over the first pane. Thereupon, the cavity or hollow space arising between the second pane, on the one hand, and the third pane on the other hand, is filled outside at the edge of the packet at least partially with a molecular sieve material (e.g. sodium aluminum silicates or zeolites), whereupon the remaining hollow space at the outermost edge is sealed with a moisture-repelling cement or putty.

In the figures of the drawing, the process of the invention and the resulting product is represented by way of example.

Figure 1:
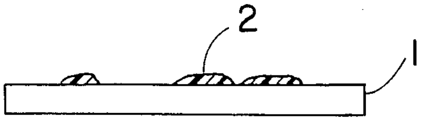
FIGS. 1-3 show three process steps which follow in succession in the production of the multilayer glass plate.
Figure 2:
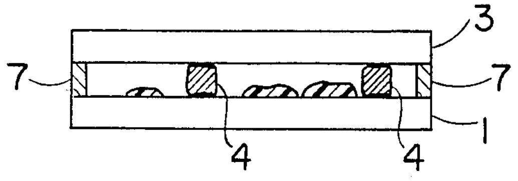
Figure 3:
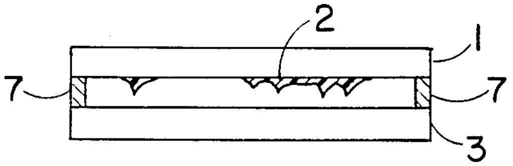

The viscous synthetic material (e.g. a hardenable plastic or resin) is applied onto the horontally lying pane 1 as portions 2 of different thicknesses (FIG. 1), and shaped pieces are also inserted. Then, the second pane 3 is mounted thereon at a spaced interval (FIG. 2). The resulting set or packet is provided with the mounting frame 7 and rotated through 180° (i.e. turned upside down). Depending on the viscosity of the synthetic material, which hardens slowly, there are formed threads or drops running downwardly, which after a relatively long dwell time or standing time can even reach and join the second pane 3 (see FIG. 3).

Figure 4:
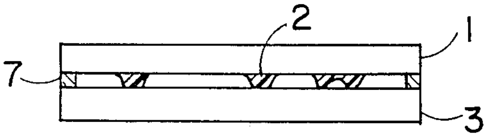
FIGS. 4 and 5 show two forms of execution of the plate.
Figure 5:
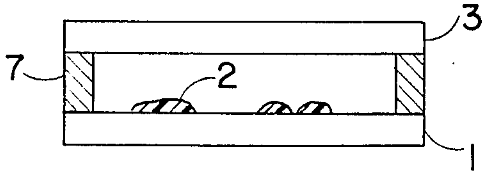

If the two panes are firmly pressed one upon the other (as in FIG. 4), then the synthetic material also comes in contact with the second pane. FIG. 5 shows the formation of the multilayer plate structure with increased spacing of the plates for better noise and heat insulation.

Figure 6:
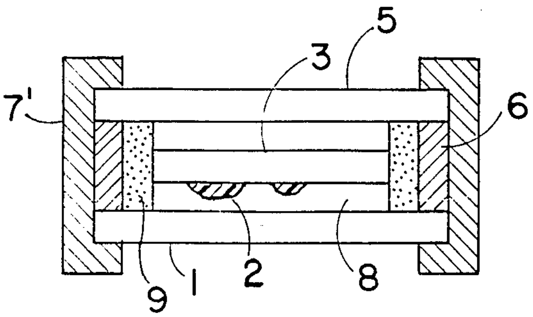
FIG. 6 shows an insulating plate with 3 panes.

In order to prevent atmospheric moisture from penetrating into the inner space or gap between the two plates, the intermediate pane 3, which is smaller than the other two panes 1 and 5, is arranged between the two panes 1 and 5 (see FIG. 6). For the absorption of water vapor, there is provided at the inner edge of the hollow space 8, an inwardly perforated container 9 with molecular sieve material. With the cement or putty layer 6, the entire multilayer plate unit is sealed against water vapor from the outside, being mounted in the outer frame 7'.

It is also feasible according to FIG. 5 to omit the middle plate 3 of FIG. 6 but with the beads, drops or coating of the synthetic material 2 being placed on the plate 1.

I claim:

1. Process for the production of multilayer glass plates of a plurality of panes spaced from one another in a frame with hardenable synthetic material and shaped bodies in the intervening space between the panes, said process comprising the steps of:

applying synthetic material onto a horizontally positioned first pane of glass, the synthetic material being applied before hardening while in a viscous state at selected places and in uneven thickness, putting shaped bodies onto or between the surface portions which are covered with synthetic material, laying a second pane at a spaced interval over the first pane such that the synthetic material is not touched, surrounding the packet consisting of the two panes with the frame, rotating the packet through 180°, maintaining the packet in the rotated position while the viscous synthetic material flows downwardly with a formation of threads or drops joining the two panes, and bonding the two panes together by the threads or drops of hardened synthetic material.

2. Process according to claim 1, wherein the synthetic material is applied with increasing thickness in lengthwise direction of the pane.

3. Process according to claim 1, wherein the panes are pressed unevenly on one another with formation of concave and convex sites.

4. Process acccording to claim 1, wherein a second pane is used which is smaller than the first pane and, after the rotation, a third pane is laid on the packet with spacing over the first pane, and the hollow space resulting between the first pane, on the one hand, and the third pane, on the other hand, is filled outside along the edge of the packet at least partially with a molecular sieve material, while the remaining hollow space is sealed at the edge with a moisture-repelling cement.

5. Process according to claim 1 wherein, in order to form bubbles or textures in the synthetic material, the two panes after being rotated are pressed on one another by the frame.

6. Process according to claim 5, wherein the two panes are pressed on one another in sloping position to one another.

7. Process according to claim 5, wherein the panes are pressed unevenly on one another with formation of concave and convex sites.

* * * * *